(12) United States Patent
Kulkarni et al.

(10) Patent No.: US 12,321,777 B2
(45) Date of Patent: Jun. 3, 2025

(54) AUTOMATIC WORKFLOW GENERATION AND OPTIMIZATION

(71) Applicant: Accenture Global Solutions Limited, Dublin (IE)

(72) Inventors: Aditi Kulkarni, Bangalore (IN); Anubhav Gupta, Meerut (IN); Aravind Nagaraj, Bangalore (IN); Ashwini Surve, Mumbai (IN); Geetika Pant, Lucknow (IN); Saikat Banerjee, Bangalore (IN); Rejeesh Katathanadan, Bangalore (IN); Raghavendra Meharwade, Bangalore (IN); Rajmohan Palanikumar, Madurai (IN); Koushik M. Vijayaraghavan, Chennai (IN); Rajesh Nagarajan, Chennai (IN); Mark Lazarus, Caulfield (AU)

(73) Assignee: Accenture Global Solutions Limited, Dublin (IE)

(*) Notice: Subject to any disclaimer, the term of this patent is extended or adjusted under 35 U.S.C. 154(b) by 357 days.

(21) Appl. No.: 17/970,213

(22) Filed: Oct. 20, 2022

(65) Prior Publication Data
US 2024/0134682 A1 Apr. 25, 2024
US 2024/0231891 A9 Jul. 11, 2024

(51) Int. Cl.
G06F 9/44 (2018.01)
G06F 9/48 (2006.01)
G06N 20/10 (2019.01)

(52) U.S. Cl.
CPC ............ *G06F 9/485* (2013.01); *G06N 20/10* (2019.01)

(58) Field of Classification Search
CPC ..................................................... G06F 9/485
USPC ..................................................... 718/102
See application file for complete search history.

(56) References Cited

U.S. PATENT DOCUMENTS

2022/0138004 A1* 5/2022 Nandakumar ........... G06N 5/01
718/102

\* cited by examiner

*Primary Examiner* — Timothy A Mudrick
(74) *Attorney, Agent, or Firm* — Polsinelli PC

(57) ABSTRACT

In some implementations, a device may receive training data identifying a set of workflows. The device may generate a set of workflow templates based on the training data identifying the set of workflows, wherein a workflow template, of the set of workflow templates, is associated with a set of steps for completing a task associated with the workflow template. The device may receive, from a client device associated with an entity, a new task for automation using a new workflow. The device may parse the new task to identify one or more steps associated with the new task. The device may identify one or more workflow templates. The device may a workflow recommendation relating to the one or more workflow templates. The device may output workflow data associated with the workflow recommendation.

20 Claims, 10 Drawing Sheets

AUTOMATIC WORKFLOW GENERATION AND OPTIMIZATION

BACKGROUND

A workflow may include a set of tasks that are performed to complete a process. Workflows may be used for manufacturing, providing services, developing software, or processing data, among other examples. A device may receive a workflow and follow the set of tasks of the workflow to automatically complete a process. Process automation, using workflows, can enable entities to scale activities, such as allowing more efficient and/or larger scale manufacturing, service provisioning, software development, or data processing, among other examples.

SUMMARY

Some implementations described herein relate to a device. The device may include one or more memories and one or more processors communicatively coupled to the one or more memories. The device may be configured to receive training data identifying a set of workflows. The device may be configured to generate a set of workflow templates based on the training data identifying the set of workflows. The device may be configured to receive, from a client device associated with an entity, a new task for automation using a new workflow. The device may be configured to parse the new task to identify one or more steps associated with the new task. The device may be configured to process information associated with the one or more steps to identify one or more workflow templates, of the set of workflow templates, satisfying a matching score threshold with the new task. The device may be configured to generate a workflow recommendation relating to the one or more workflow templates. The device may be configured to output workflow data associated with the workflow recommendation.

Some implementations described herein relate to a method. The method may include receiving, by a device, training data identifying a set of workflows. The method may include generating, by the device, a set of workflow templates based on the training data identifying the set of workflows, where a workflow template, of the set of workflow templates, is associated with a set of steps for completing a task associated with the workflow template. The method may include receiving, by the device and from a client device associated with an entity, a new task for automation using a new workflow. The method may include parsing, by the device, the new task to identify one or more steps associated with the new task. The method may include processing, by the device, information associated with the one or more steps to identify one or more workflow templates, of the set of workflow templates, satisfying a matching score threshold with the new task. The method may include generating, by the device and using a recommendation engine, a workflow recommendation relating to the one or more workflow templates. The method may include outputting, by the device, workflow data associated with the workflow recommendation.

Some implementations described herein relate to a non-transitory computer-readable medium that stores a set of instructions for a device. The set of instructions, when executed by one or more processors of the device, may cause the device to receive, from a client device associated with an entity, a new task for automation using a new workflow. The set of instructions, when executed by one or more processors of the device, may cause the device to parse the new task to identify one or more steps associated with the new task. The set of instructions, when executed by one or more processors of the device, may cause the device to identify one or more workflow templates satisfying a threshold matching score with the one or more steps. The set of instructions, when executed by one or more processors of the device, may cause the device to create a new workflow based on the one or more workflow templates. The set of instructions, when executed by one or more processors of the device, may cause the device to add one or more new steps to the new workflow. The set of instructions, when executed by one or more processors of the device, may cause the device to associate one or more assets with a step of the one or more new steps. The set of instructions, when executed by one or more processors of the device, may cause the device to generate one or more rules for the new workflow based on the one or more assets. The set of instructions, when executed by one or more processors of the device, may cause the device to select one or more trigger points for the new workflow based on the one or more rules. The set of instructions, when executed by one or more processors of the device, may cause the device to set up one or more notifications for the new workflow based on the one or more trigger points.

DETAILED DESCRIPTION

Figure 1A:
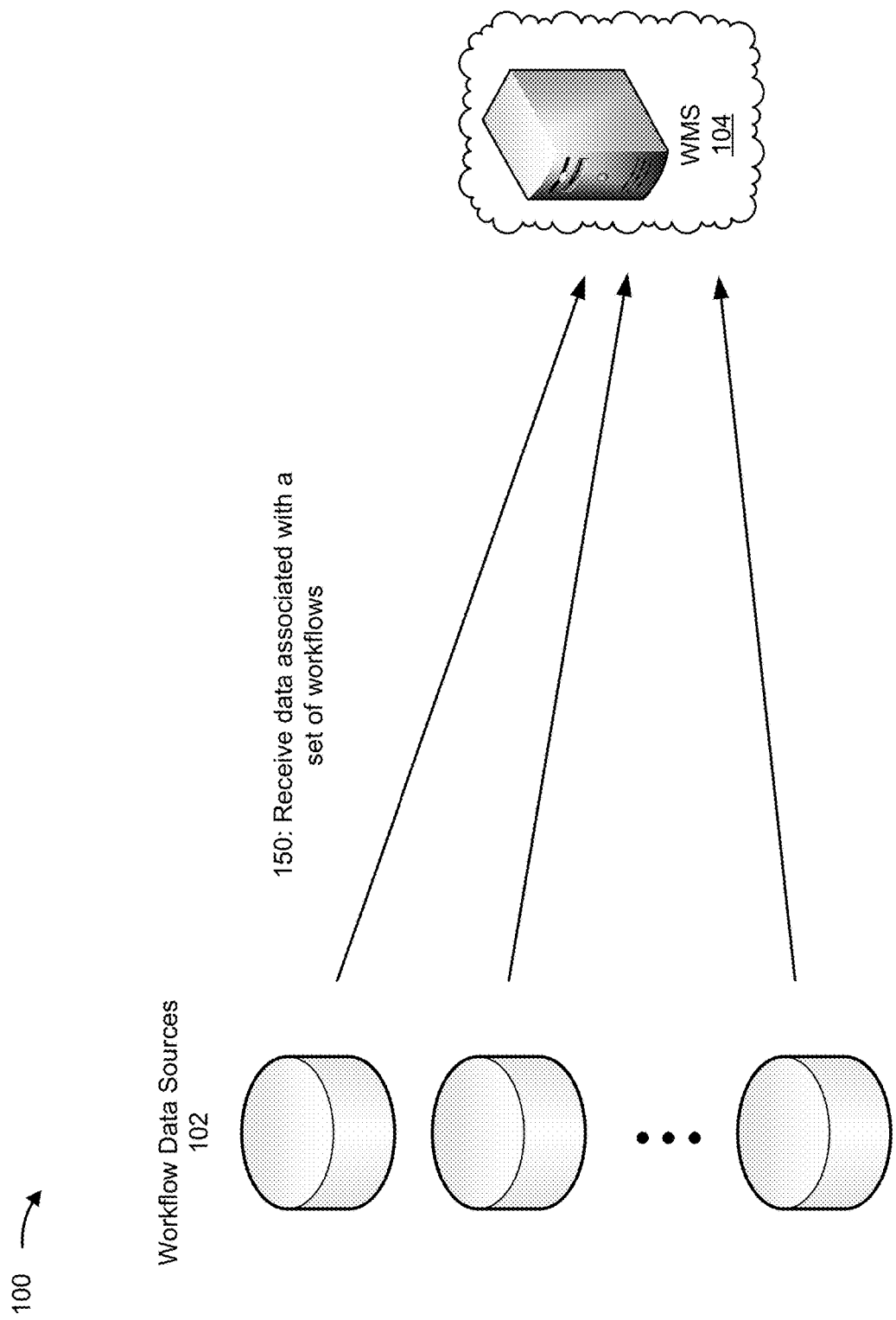
FIGS. 1A-1D are diagrams of an example implementation associated with automatic workflow generation and optimization.

The following detailed description of example implementations refers to the accompanying drawings. The same reference numbers in different drawings may identify the same or similar elements.

A device may use a workflow to determine a set of steps or operations to perform in order to complete a task. For example, in a software development context, the device (e.g., an automatic code generation system) may perform steps, such as obtaining requirements, generating code based on the requirements, compiling the code, error-testing the code, publishing the code, and monitoring for trouble tickets associated with the code. As another example, in a manufacturing context, the device (e.g., an automated assembly device) may obtain a set of parts, assemble the set of parts, inspect an assembly of the set of parts for defects, perform one or more tests on the assembly, and provide the assembly as output.

However, the creation of workflows is slow and error-prone, which may limit an ability to implement automated task completion systems, such as automatic code generation systems or automated assembly devices. Moreover, use of a statically defined workflow may result in failures to complete automated tasks as a result of errors during completion of the workflow or changed conditions that may occur during the completion of the workflow. For example, in a software development context, a lack of computing resources or other assets may prevent automatic code generation or testing. Similarly, in a manufacturing context, a change to an environmental condition may result in a poor outcome during assembly.

Some implementations described herein provide for automated generation and optimization of workflows. For example, a workflow management system may train a recommendation engine (e.g., an artificial intelligence model) to recommend workflow templates (e.g., a template predictor) from which to build a workflow for task completion. Additionally, or alternatively, the workflow management system may automatically build a new workflow for task completion based on the recommended workflow templates. Additionally, or alternatively, the workflow management system may monitor task completion using the new workflow and may automatically revise or update the new workflow based on conditions occurring during task completion. In this way, entities can automate and/or use automated systems to complete additional tasks, thereby improving a scale of the tasks (e.g., a scale of software development or of manufacturing) and/or an accuracy of completion of those tasks. Moreover, based on applying a rigorous system to analyze millions, billions, or trillions of data points, a likelihood of a generated workflow causing an error in task completion is reduced, thereby reducing a likelihood of wasting computing resources debugging an error and/or wasting physical resources replacing a faulty part.

FIGS. 1A-1D are diagrams of an example implementation 100 associated with automatic workflow generation and optimization. As shown in FIGS. 1A-1D, example implementation 100 includes a set of workflow data sources 102, a workflow management system 104, and a client device 106. These devices are described in more detail below in connection with FIG. 3 and FIG. 4.

As further shown in FIG. 1A, and by reference number 150, the workflow management system 104 may receive data associated with a set of workflows. For example, the workflow management system 104 may receive training data for training one or more machine learning models, as described herein. In some implementations, the workflow management system 104 may receive data identifying one or more processes for which one or more workflows have been used. For example, the workflow management system 104 may receive information identifying a workflow, a process that used the workflow, information regarding completion of the process (e.g., resources used to complete the process, time elapsed at each step of the process, or whether the process was completed successfully), among other examples.

In some implementations, the workflow management system 104 may receive the data associated with the set of workflows from data storage associated with a set of workflow data sources 102. For example, the workflow management system 104 may request and receive data that is collected in connection with completing a set of processes associated with the set of workflows. In this case, the workflow data sources 102 may obtain and store information, such as log files, sensor readings, or user feedback, among other examples, regarding the set of workflows and may provide the information to the workflow management system 104.

Additionally, or alternatively, the workflow management system 104 may obtain data regarding the set of workflows directly. For example, the workflow management system 104 may identify one or more stakeholders associated with completing a process and may transmit a request that the one or more stakeholders provide feedback information regarding the process. In this case, the workflow management system 104 may merge the feedback information with other data associated with a workflow to ensure that data for training a machine learning model (e.g., a model associated with selecting, optimizing, or customizing a workflow) is trained to perform high quality predictions (e.g., predictions with a threshold level of accuracy).

In some implementations, the workflow management system 104 may reformat data to obtain data regarding the set of workflows (or a task for which a workflow is to be generated). For example, the workflow management system 104 may obtain data from a software ecosystem of an entity (e.g., from an internal network of the entity) and reformat the data for storage in a data lake (e.g., a centralized (cloud) repository for storing structured or unstructured data) associated with the workflow management system 104. In this way, by transforming the data into a unified format, the data can be integrated with other data from other entities for use in training, prediction, and recommendation output.

Figure 1B:
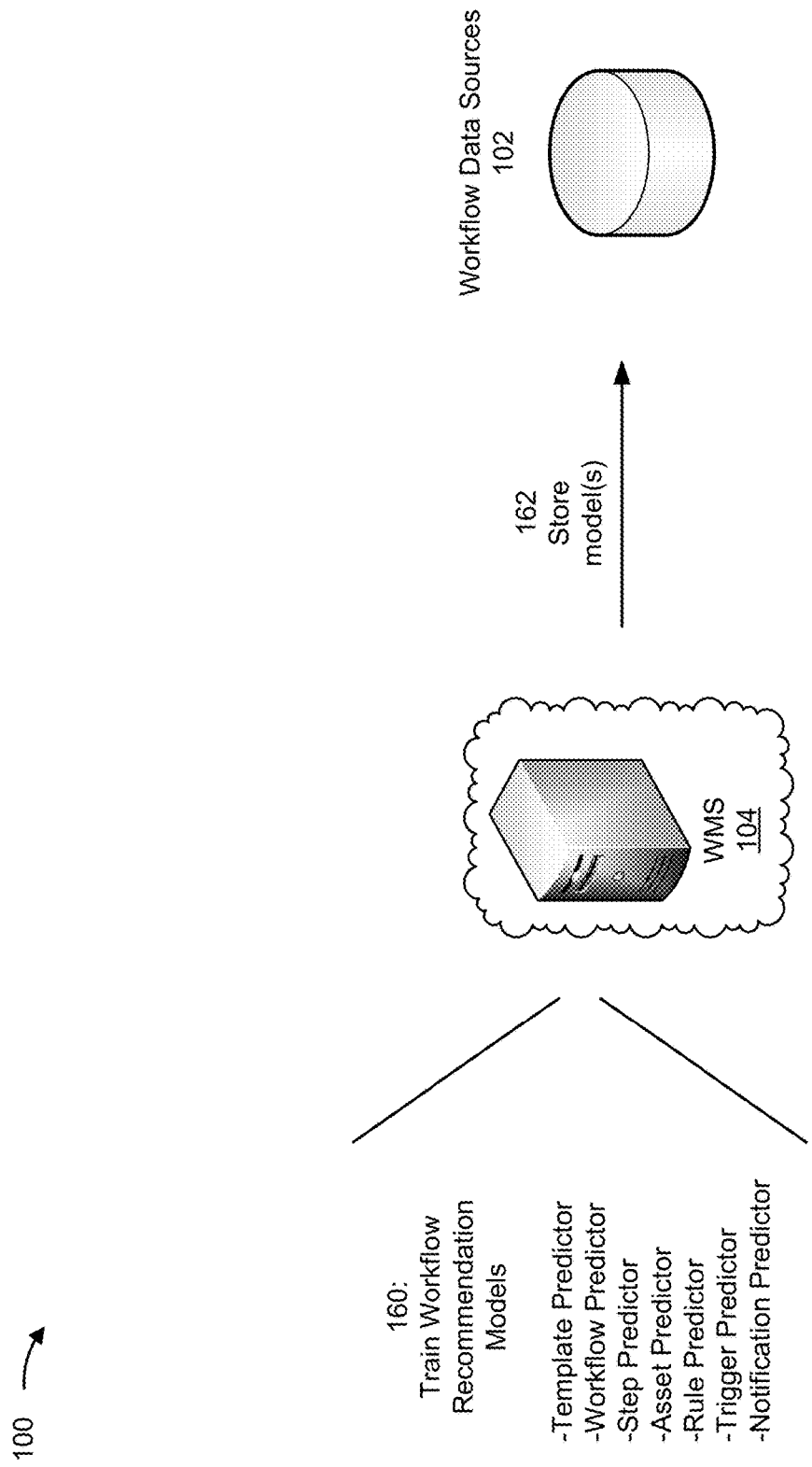

As shown in FIG. 1B, and by reference numbers 160 and 162, the workflow management system 104 may train and store one or more workflow recommendation models. For example, the workflow management system 104 may train a template predictor model. In one example, the workflow management system 104 may train one or more workflow recommendation models using clustering and classification with an inference and recommendation engine. For example, the workflow management system 104 may obtain user activity data and store the activity data in a database. The workflow management system 104 may use an analyzer component to group similar users (e.g., with similar navigation patterns or user activity patterns when using a user interface). The workflow management system 104 may generate recommendations to groups of users based on what other users in the group of users have done in their respective user activities. The workflow management system 104 may periodically or continuously update the recommendation system based on new user activity.

The template predictor model may include a model associated with predicting and/or selecting a workflow template that is to be used for generating a custom workflow for a process. For example, when the workflow management system 104 receives a new process for automation via a custom workflow, the workflow management system 104 may predict a workflow template that can be used as a baseline for the custom workflow. The workflow template may include a set of nodes and edges (e.g., representing a set of steps and relationships). In some implementations, the workflow management system 104 may train the template predictor model using the data associated with the set of workflows. For example, the workflow management system 104 may train the template predictor model to select a stored workflow as a template for generating a new, custom workflow. In some implementations, the workflow management system 104 may train the template predictor model using information regarding a set of software development lifecycle phases, work that is performed during each phase, or historical usage of workflows for which the workflow management system 104 has received information, among other examples.

Additionally, or alternatively, the workflow management system 104 may modify a received workflow to generate a template. For example, the workflow management system 104 may automatically identify commonalities between groups of workflows (e.g., using a cluster prediction technique type of artificial intelligence model) and may isolate the commonalities (e.g., a common set of nodes or edges) as a workflow template on which to build subsequent, custom workflows. In this case, the workflow management system 104 may train the template predictor model to identify commonalities between a new process and stored process information relating to previous processes completed using previous workflows. For example, when the workflow management system 104 determines that the new process shares the aforementioned commonalities with the group of workflows identified using cluster prediction, the workflow management system 104 may select the template generated from the group of workflows for generating a new, custom template for the new process. Examples of commonalities may include common industries, types of process (e.g., software development or manufacturing), equipment (e.g., a particular type of machine or operating system), entity (e.g., the same company or organization), time scale, or requirements, among other examples. Additionally, or alternatively, the workflow management system 104 may train the template predictor model to predict a template to use based on user and project demographic data or data entities being manipulated by a process, among other examples.

Additionally, or alternatively, the workflow management system 104 may train a workflow predictor model. The workflow predictor model may create a workflow based on a template selected by the template predictor model. For example, the workflow management system 104 may train the workflow predictor model to recommend aspects for inclusion into the selected template based on a workflow name and description or a selected entity, among other examples. Additionally, or alternatively, the workflow management system 104 may train a step predictor model. The step predictor model may identify one or steps for completing a process and recommend inclusion of the one or more steps into a workflow (e.g., to generate a custom workflow from the selected template with the recommended aspects). For example, the workflow management system 104 may train the step predictor model to predict, based on attributes of a process and/or previous steps in a workflow, one or more new steps to add to a workflow.

In some implementations, the workflow management system 104 may provide a user interface with which to receive input regarding one or more steps of a workflow. For example, the workflow management system 104 may provide a user interface (e.g., via a client device 106, as described herein) with which a user can create, draw, or otherwise identify portions of the workflow, such as steps, rules, triggers, or notifications. In this case, the workflow management system 104 may receive input via the user interface and use one or more other models described herein to automatically associate user-specified portions of the workflow with other events, notifications, assets, or application programming interfaces, thereby enabling a user to specify only some of a workflow rather than all of a workflow. This reduces user usage of client device 106, thereby reducing a consumption of processing or energy resources relative to a workflow management tool that requires complete user specification of a workflow.

Additionally, or alternatively, the workflow management system 104 may train an asset predictor model. The asset predictor model may predict one or more assets (e.g., software assets or hardware assets) to associate with one or more steps. An asset may include a computing resource that is allocated for completing a step in a workflow, a hardware component that is used to complete a step in a workflow, or a monitoring component for monitoring completion of a step in a workflow. For example, a monitoring component may include a user interface widget for displaying completion progression. In this case, the user interface widget may be associated with an application programming interface (API) and/or one or more computing resources that the workflow management system 104 may assign or reserve for the user interface widget based on the asset predictor model predicting use of the user interface widget. In some implementations, the workflow management system 104 may train the asset predictor model to use a step title, a step description, or an entity associated with a step, among other examples, to recommend an asset to associate with a step.

Additionally, or alternatively, the workflow management system 104 may train a rule predictor model. The rule predictor model may predict one or more rules for a step (e.g., a rule for completion, abandonment, or restarting of a step). For example, the workflow management system 104 may train the rule predictor model to use information regarding assets associated with a step or information regarding the step (e.g., a step title, description, entity or type, such as an automatic step or a manual step) to predict a rule for the step. Additionally, or alternatively, the workflow management system 104 may train a trigger predictor model. The trigger predictor model may predict one or more trigger points or events for a workflow. For example, the workflow management system 104 may train the trigger predictor model to predict trigger points for taking an action (e.g., moving to a new step, restarting a step, or generating a notification) based on a set of rules predicted by the rule predictor model. The workflow management system 104 may store a library of events that can transition activities in a workflow (e.g., from a first activity of a first step to a second activity of a second step). In some implementations, the events may be associated with one or more assets (e.g., widgets) for monitoring completion and/or progress toward an event. Accordingly, an event may be associated with computing resources for, for example, displaying the one or more assets. In this case, the workflow management system 104 may automatically reserve or allocate resources based at least in part on predicting inclusion of a trigger and associated event into a workflow.

Additionally, or alternatively, the workflow management system 104 may train a notification predictor or notification advisor model. The notification predictor model may predict one or more notifications to generate in connection with the workflow. For example, the workflow management system 104 may train the notification predictor model to generate notifications at trigger points identified by the trigger predictor model. Examples of notifications may include email notifications, short message service (SMS) notifications, or videoconferencing notifications (e.g., establishment of videoconferences between stakeholders), among other examples. In this case, the workflow management system 104 may automatically reserve resources for transmission of notifications. For example, the workflow management system 104 may automatically allocate bandwidth resources for SMS messaging or videoconferencing in connection with a notification of satisfaction of a trigger in the workflow.

Figure 1C:
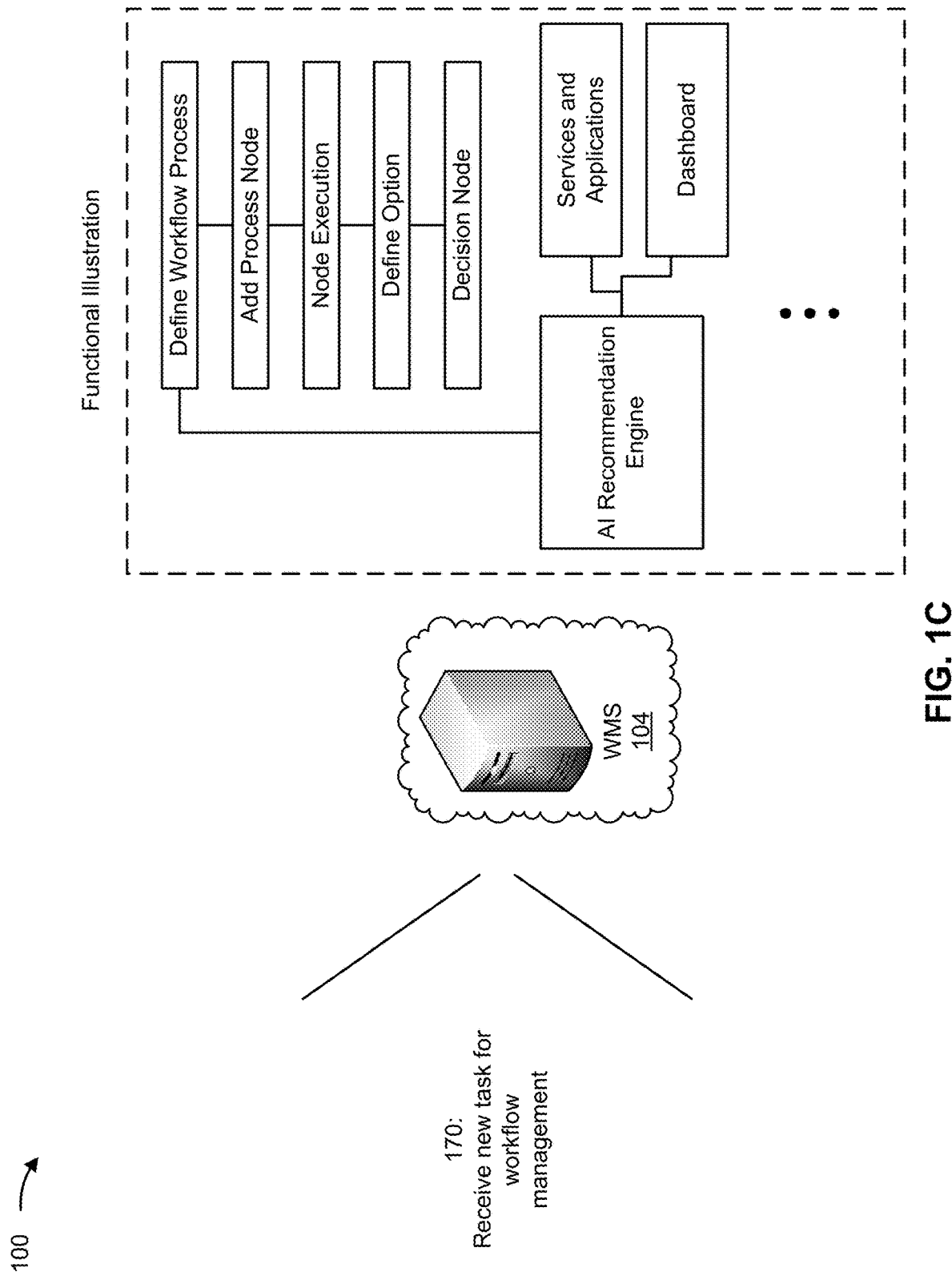

As shown in FIG. 1C, and by reference number 170, the workflow management system 104 may receive information identifying a new task or process for workflow management. For example, the workflow management system 104 may receive information identifying a software development task or a manufacturing task that is to be automatically managed and/or completed using a workflow. The workflow management system 104 may select a workflow template and customize the workflow template to generate a new workflow. For example, the workflow management system 104 may parse the new task to identify one or more steps, process information associated with the one or more steps to identify a workflow template that corresponds to the one or more steps, and generate a workflow recommendation to use the identified workflow template. In this case, the workflow management system 104 may customize the workflow template by adding workflow elements or steps to the workflow template or associating assets, rules, triggers, and/or notifications with the workflow template. In this way, the workflow management system 104 generates a new workflow. The workflow management system 104 may output workflow data, such as a workflow recommendation (e.g., for selection and/or confirmation by a user via a user interface) or a generated, new workflow (e.g., for execution by a manufacturing device or a computing system). As an example, the workflow management system 104 may identify, from data associated with a task, a set of releases for software development and may select a workflow or workflow template associated with software development. In this case, the workflow management system 104 may provide, via a user interface, the workflow or workflow template for software development (or, more specifically, for planning for a release) (e.g., the workflow management system 104 may autogenerate a workflow for each release of the set of releases). In this case, the user may confirm the workflows via the user interface, and the workflow management system 104 may automatically start the workflows and transmit notifications based on the user confirmation.

In some implementations, the workflow management system 104 may provide a workflow recommendation identifying a template for a user to use in specifying one or more aspects of a workflow. For example, the workflow management system 104 may use artificial intelligence to process data regarding a task or process and identify a workflow template matching the task or process. In this case, the workflow management system 104 may provide the workflow template via a user interface for a user to enable the user to use the user interface to customize a workflow based on the workflow template. In this case, by automatically providing a selected workflow template, the workflow management system 104 reduces a resource utilization associated with using a user interface to generate a workflow, relative to providing a blank user interface without a workflow template. Moreover, based on using artificial intelligence to select the workflow template from, for example, many possible workflow templates, the workflow management system 104 reduces an amount of customization that the user is to do in order to adapt the workflow template to a task, relative to statically providing a single type of workflow template.

In some implementations, the workflow management system 104 may generate a workflow by defining a workflow process (e.g., selecting a workflow template), adding process nodes to the workflow process (e.g., which correspond to steps for completing the task), defining a node execution type for the process nodes (e.g., whether nodes manually execute or automatically execute and, if automatically, which entities or assets perform the automatic execution), defining options for the process node execution (e.g., whether execution is optional or mandatory for the task), or defining decision nodes (e.g., process branches and relationships therewith), among other examples. The workflow management system 104 may generate the workflow using an artificial intelligence (AI) recommendation engine with a set of models, as described in more detail herein, and which may have a set of associated services or applications. In some implementations, the workflow management system 104 may perform a validity check to predict whether a generated workflow will be valid (e.g., predict a likelihood of success in executing a generated workflow). In this case, the workflow management system 104 may generate and output a set of recommendations for improving a likelihood of success at executing the generated workflow for display in a user interface. A user may select one or more of the set of recommendations for implementation in and/or alteration of the generated workflow.

In some implementations, the workflow management system 104 may fail to identify or successfully generate a workflow. For example, the workflow management system 104 may determine that there is not a workflow template that satisfies a threshold similarity score or other scoring in relation to a task or process for which the workflow management system 104 is to generate a workflow recommendation. In this case, the workflow management system 104 may automatically request that additional workflow templates be provided or may monitor user creation of a workflow and generate a new workflow template based on the user creation of the workflow to avoid subsequent failures.

Figure 1D:
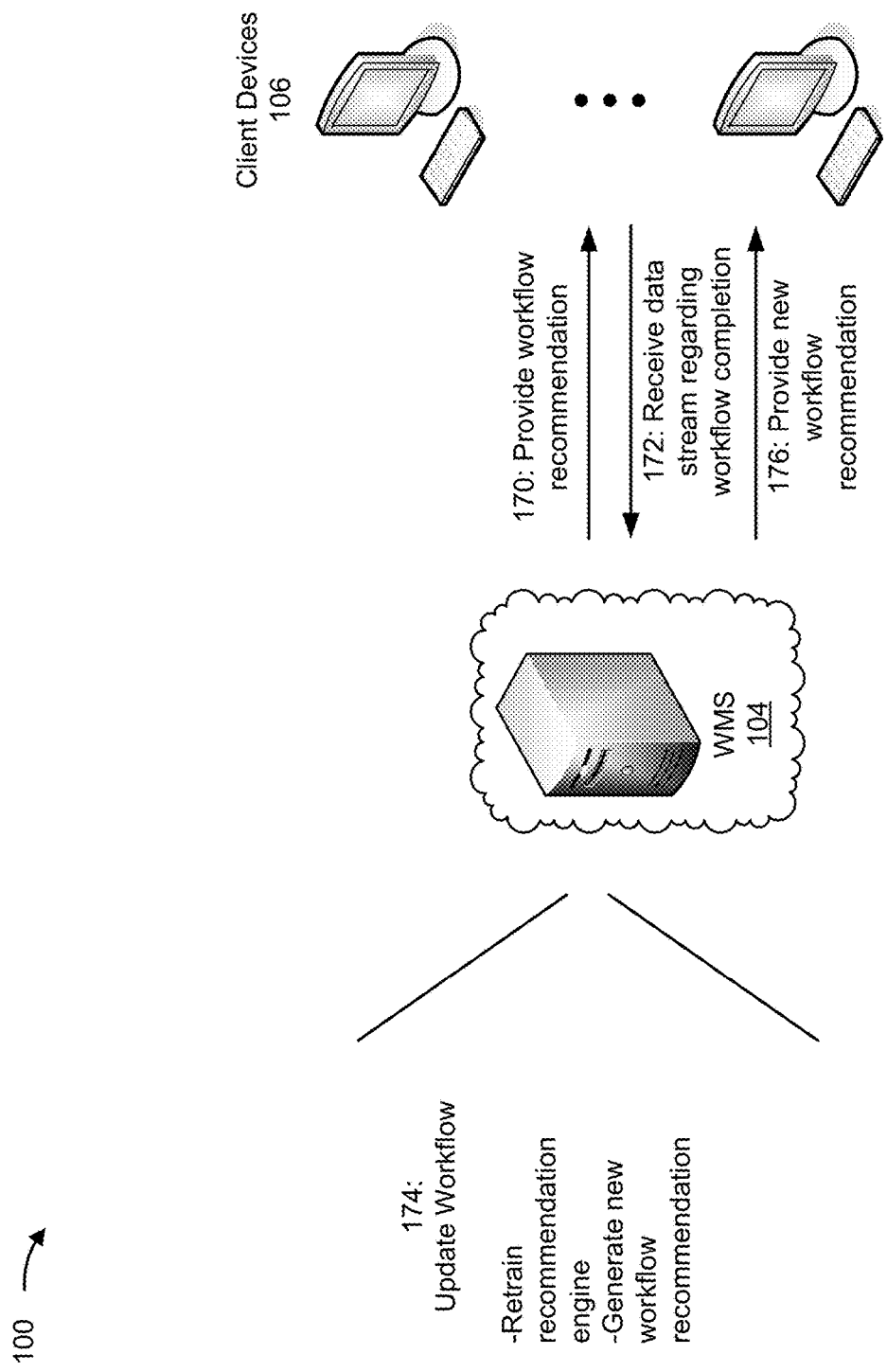

As shown in FIG. 1D, and by reference number 170, the workflow management system 104 may provide a workflow recommendation to client device 106. For example, as described above, the workflow management system 104 may output a recommendation associated with generating a workflow (e.g., a recommended or predicted portion of the workflow) and/or may output a workflow. The workflow management system 104 may provide the workflow recommendation to a set of client devices 106 associated with a set of stakeholders. For example, the workflow management system 104 may provide a recommendation for improving a workflow to a client device 106 operated by a manager associated with overseeing completion of a task corresponding to the workflow. Additionally, or alternatively, the workflow management system 104 may provide the workflow to a set of client devices 106 associated with a set of software developers who are associated with writing code for completing steps of the workflow. Additionally, or alternatively, the workflow management system 104 may output the workflow to a client device 106 associated with automatically executing a workflow, such as a client device 106 that operates a manufacturing device or a client device 106 associated with automatically generating software code using a code generation system.

As further shown in FIG. 1D, and by reference numbers 172, 174, and 176, the workflow management system 104 may periodically update a workflow. For example, the workflow management system 104 may receive a data stream regarding workflow completion, which may include a set of sensor measurements, results of executing code segments, user feedback, change requests, trouble tickets, a social media feed, or a set of interactions with a user interface. In some implementations, the workflow management system 104 may apply one or more analytics techniques to determine whether to optimize a workflow based on a status (e.g., using a workflow or template optimizer). For example, the workflow management system 104 may apply regression techniques, machine learning techniques, or pattern recognition techniques to predict, for example, whether a schedule associated with the workflow is to be updated based on a current status of the workflow.

The workflow management system 104 may identify whether the workflow is to be updated based on the data stream (e.g., using a workflow usage analyzer). For example, the workflow management system 104 may determine that completion of the workflow has deviated from an expected completion of the workflow with respect to timing (e.g., a step is taking longer than predicted). Additionally, or alternatively, the workflow management system 104 may determine that an asset is no longer available, such as a machine no longer being usable or a software resource being reallocated. In some implementations, the workflow management system 104 may monitor client devices 106 to obtain data regarding completion of the workflow. For example, the workflow management system 104 may monitor software development activities performed via client devices 106 to determine whether to update or optimize a workflow based on a status of work being performed in connection with the workflow.

The workflow management system 104 may retrain a recommendation engine, such as one or more of the aforementioned predictor models, based on the data stream, and may generate a new workflow recommendation. The new workflow recommendation may include information identifying alternate timing, alternate assets, alternate rules, or alternate notifications, among other examples, and may be provided to the set of client devices 106 for confirmation and/or implementation. In some implementations, the workflow management system 104 may automatically implement the new workflow recommendation, transmit notifications regarding the new workflow recommendation, update schedules for the new workflow recommendation, re-allocate or reassign computing or machine resources for the new workflow recommendation, or update a user interface based on the new workflow recommendation, among other examples.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
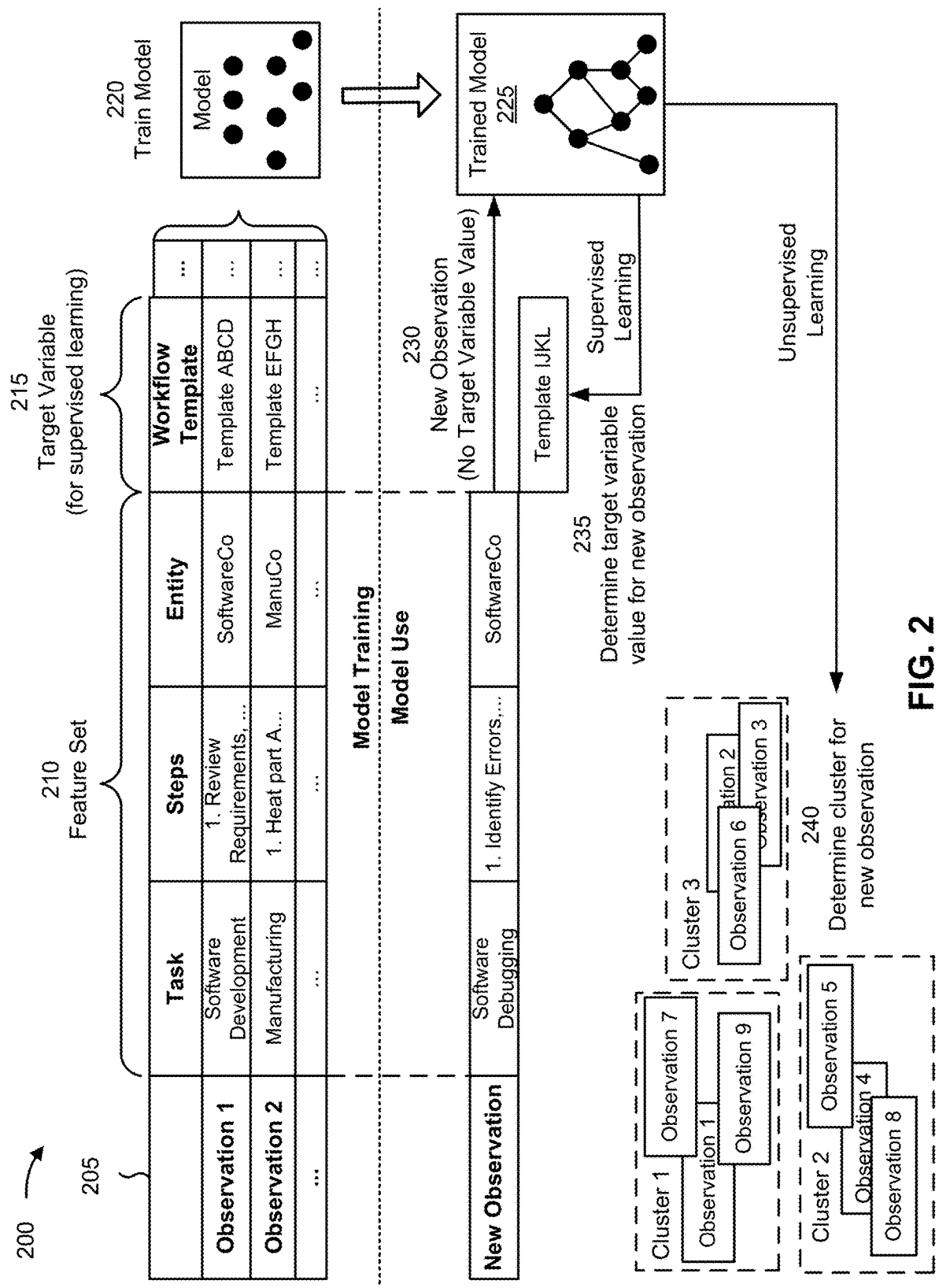
FIG. 2 is a diagram illustrating an example of training and using a machine learning model in connection with automatic workflow generation and optimization.

FIG. 2 is a diagram illustrating an example 200 of training and using a machine learning model in connection with automatic workflow generation and optimization. The machine learning model training and usage described herein may be performed using a machine learning system. The machine learning system may include or may be included in a computing device, a server, a cloud computing environment, or the like, such as the workflow management system 301 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from data source 340, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from data source 340. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a task for completion, a second feature of steps to complete the task, a third feature of an entity for which the task is to be completed, and so on. As shown, for a first observation, the first feature may have a value of "Software Development", the second feature may have a value of "1. Review Requirements, . . . ", the third feature may have a value of "Template ABCD", and so on. These features and feature values are provided as examples, and may differ in other examples. For example, the feature set may include one or more of the following features: a workflow scope, a workflow application, a workflow function, a workflow event, a workflow asset, a workflow notification, a workflow status, a workflow change request, a workflow usage, a parent workflow, a similar workflow, a project profile (e.g., a project demographic, methodology, tool, technology, tooling ecosystem, or skill), a previously recommended workflow, or an associated work item, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a workflow template (e.g., to recommend and/or customize), which has a value of "Template ABCD" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, the machine learning system may use a regression random forest algorithm to train a recommendation engine for workflows based on project profile features and previously recommended workflows and associated work items features. Similarly, the machine learning system may use a naïve Bayes classification algorithm to train the recommendation engine for asset recommendation, a regression random forest algorithm to train the recommendation engine for template recommendation, a k-means clustering algorithm to train the recommendation engine for workflow usage pattern prediction or template optimization recommendation, or a discriminant analysis algorithm for step usage pattern recommendation, among other examples. After training, the machine learning system may store the machine learning model as a trained machine learning model 225 to be used to analyze new observations.

As an example of using a random forest classifier, the machine learning system may obtain templates and/or workflows that include information, such as titles, descriptions, or work-items, among other examples. The machine learning system may extract textual attributes using a bag of words model or a k means clustering model and may build multiple decision trees. The machine learning system may merge the multiple decision trees to generate accurate and stable predictions based on user feedback. In this case, one example of a prediction is a recommended process or workflow. The machine learning system may use the random forest algorithm to create decision trees on randomly selected data samples, get a prediction from each tree, and select the best solution by a voting algorithm.

As an example of using an inference and recommendation engine, the machine learning system may obtain log data, pre-process the log data to get user activity or navigation data regarding use of a user interface, perform pattern discovery to identify clusters of common navigation patterns, perform classification to classify workflow steps by usage rate, and identify user behavior to enable suggesting of workflow steps.

As an example of using K-means clustering, the machine learning system may cluster navigation data using a K-means algorithm. K-means clustering is an example of an unsupervised learning algorithm that can be used to arrange a set of points into groups (clusters). The machine learning system selects initial centroids at random and assigns the centroids to clusters and then proceeds to find an initial mean, such that each user belonging to the same cluster has the same or similar preferences. The machine learning system updates the centroids and the clusters until one or more threshold criteria are satisfies (e.g., the machine learning system has shaped the clusters, such that each user belonging to the same cluster has the same or similar preferences).

As an example, the machine learning system may obtain training data for the set of observations based on previously executed workflows for completing processes. The machine learning system may obtain training data regarding workflow templates, workflow steps, workflow usage, or workflow outcomes, among other examples, and train a recommendation engine to recommend a workflow template to use for creating a workflow to complete a new task. Additionally, or alternatively, the machine learning system may train the recommendation engine to generate recommendations to customize a workflow from a workflow template, optimize an existing workflow, generate steps for a workflow, select assets for a workflow, recommend rules for a workflow, select triggers for a workflow, or set up notifications for a workflow, among other examples.

As shown by reference number 230, the machine learning system may apply the trained machine learning model 225 to a new observation, such as by receiving a new observation and inputting the new observation to the trained machine learning model 225. As shown, the new observation may include a first feature of "Software Debugging", a second feature of "1. Identify Errors, . . . ", a third feature of "SoftwareCo", and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of "Template IJKL" for the target variable of "Workflow Template" for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, using a particular template for workflow generation. The first automated action may include, for example, automatically customizing a selected workflow template for completion on a task.

As another example, if the machine learning system were to predict a value of a different template for the target variable of a workflow template, then the machine learning system may provide a second (e.g., different) recommendation (e.g., to use a different workflow template for generating a custom workflow for completion of a task) and/or may perform or cause performance of a second (e.g., different) automated action (e.g., recommending different steps, alerts, or assets be associated with the different workflow template for generating the custom workflow for completion of the task).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first type of task associated with a first type of workflow template), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second type of task associated with a second type of workflow template), then the machine learning system may provide a second (e.g., different) recommendation, such as the second recommendation described above and/or may perform or cause performance of a second (e.g., different) automated action, such as the second automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed on, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include whether a recommended workflow template was selected and/or a status of a task being completed using a custom template based on a recommended workflow template.

In this way, the machine learning system may apply a rigorous and automated process to workflow management for process automation. The machine learning system may enable recognition and/or identification of tens, hundreds, thousands, or millions of features and/or feature values for tens, hundreds, thousands, or millions of observations, thereby increasing accuracy and consistency and reducing delay associated with completing a process, such as a software development process or a manufacturing process relative to requiring computing resources to be allocated for tens, hundreds, or thousands of operators to manually analyze a task to prepare and a workflow, and monitor a workflow status to periodically update the workflow using the features or feature values.

As indicated above, FIG. 2 is provided as an example. Other examples may differ from what is described in connection with FIG. 2.

Figure 3:
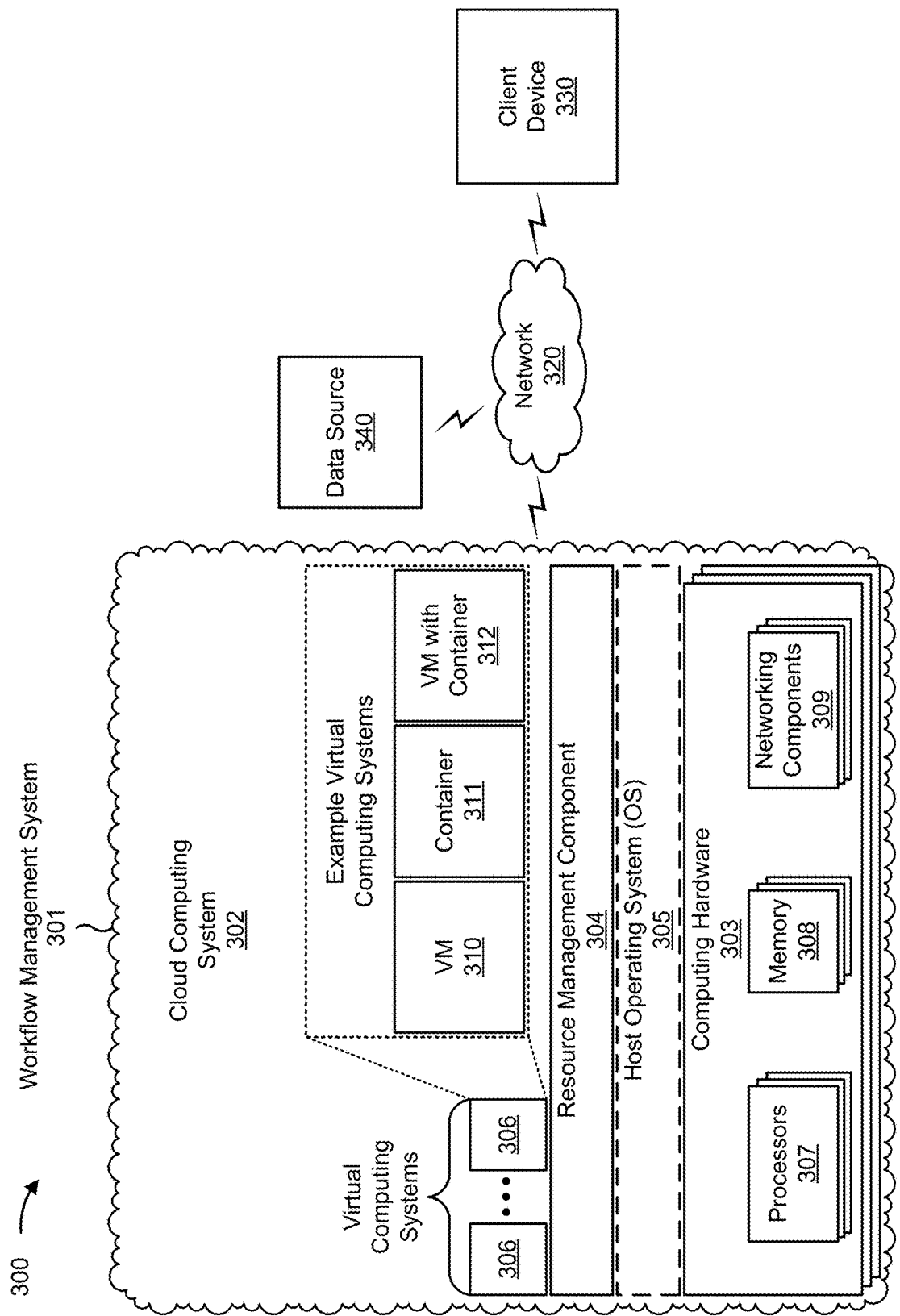
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a workflow management system 301, which may include one or more elements of and/or may execute within a cloud computing system 302. The cloud computing system 302 may include one or more elements 303-312, as described in more detail below. As further shown in FIG. 3, environment 300 may include a network 320, a client device 330, and/or a data source 340. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the workflow management system 301 may include one or more elements 303-312 of the cloud computing system 302, may execute within the cloud computing system 302, and/or may be hosted within the cloud computing system 302, in some implementations, the workflow management system 301 may not be cloud-based (e.g., may be implemented outside of a cloud computing system) or may be partially cloud-based. For example, the workflow management system 301 may include one or more devices that are not part of the cloud computing system 302, such as device 400 of FIG. 4, which may include a standalone server or another type of computing device. The workflow management system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The client device 330 may include one or more devices capable of receiving, generating, storing, processing, and/or providing information associated with automatic workflow generation and optimization, as described elsewhere herein. The client device 330 may include a communication device and/or a computing device. For example, the client device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The data source 340 may include one or more devices capable of receiving, generating, storing, processing, and/or providing information associated with automatic workflow generation and optimization, as described elsewhere herein. The data source 340 may include a communication device and/or a computing device. For example, the data source 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
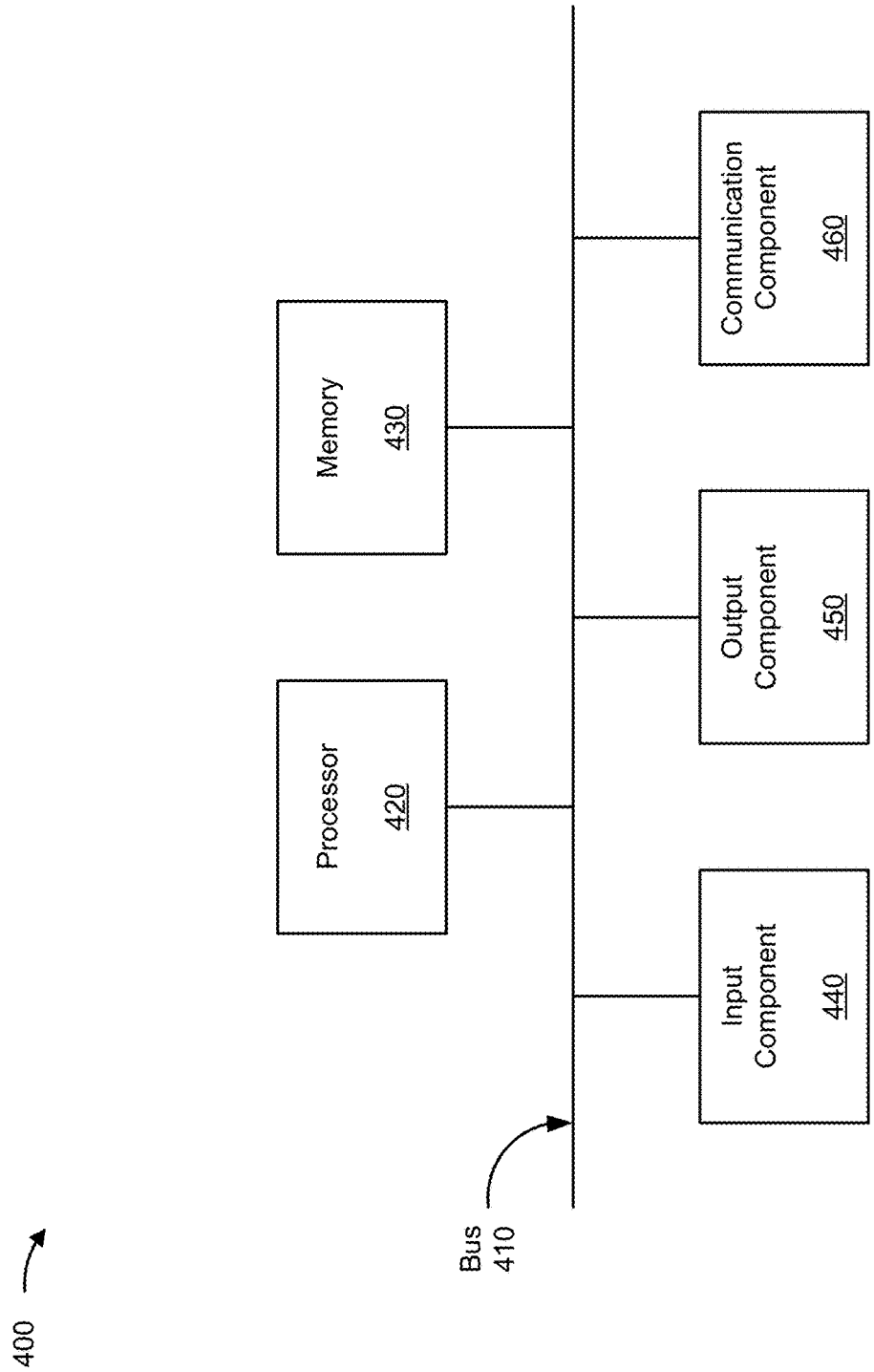
FIG. 4 is a diagram of example components of a device associated with automatic workflow generation and optimization.

FIG. 4 is a diagram of example components of a device 400 associated with automatic workflow generation and optimization. The device 400 may correspond to workflow management system 301, client device 330, and/or data source 340. In some implementations, workflow management system 301, client device 330, and/or data source 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
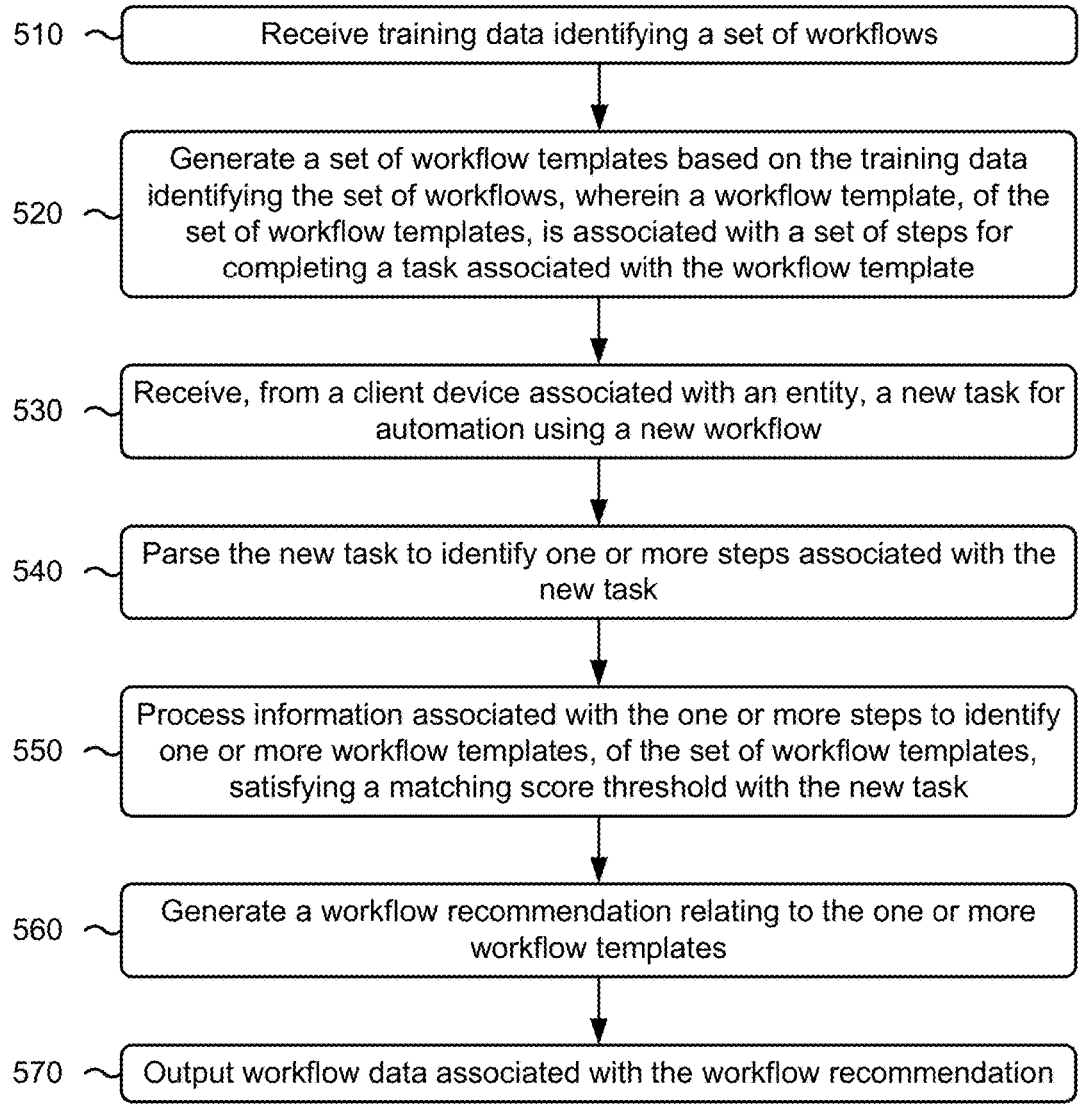
FIGS. 5-7 are flowcharts of example processes associated with automatic workflow generation and optimization.

FIG. 5 is a flowchart of an example process 500 associated with automatic workflow generation and optimization.

In some implementations, one or more process blocks of FIG. 5 are performed by a device (e.g., workflow management system 301). In some implementations, one or more process blocks of FIG. 5 are performed by another device or a group of devices separate from or including the device, such as a client device (e.g., client device 330) and/or a data source (e.g., data source 340). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving training data identifying a set of workflows (block 510). For example, the device may receive training data identifying a set of workflows, as described above.

As further shown in FIG. 5, process 500 may include generating a set of workflow templates based on the training data identifying the set of workflows, wherein a workflow template, of the set of workflow templates, is associated with a set of steps for completing a task associated with the workflow template (block 520). For example, the device may generate a set of workflow templates based on the training data identifying the set of workflows, wherein a workflow template, of the set of workflow templates, is associated with a set of steps for completing a task associated with the workflow template, as described above. In some implementations, a workflow template, of the set of workflow templates, is associated with a set of steps for completing a task associated with the workflow template.

As further shown in FIG. 5, process 500 may include receiving, from a client device associated with an entity, a new task for automation using a new workflow (block 530). For example, the device may receive, from a client device associated with an entity, a new task for automation using a new workflow, as described above.

As further shown in FIG. 5, process 500 may include parsing the new task to identify one or more steps associated with the new task (block 540). For example, the device may parse the new task to identify one or more steps associated with the new task, as described above.

As further shown in FIG. 5, process 500 may include processing information associated with the one or more steps to identify one or more workflow templates, of the set of workflow templates, satisfying a matching score threshold with the new task (block 550). For example, the device may process information associated with the one or more steps to identify one or more workflow templates, of the set of workflow templates, satisfying a matching score threshold with the new task, as described above.

As further shown in FIG. 5, process 500 may include generating a workflow recommendation relating to the one or more workflow templates (block 560). For example, the device may generate a workflow recommendation relating to the one or more workflow templates, as described above.

As further shown in FIG. 5, process 500 may include outputting workflow data associated with the workflow recommendation (block 570). For example, the device may output workflow data associated with the workflow recommendation, as described above.

Process 500 may include additional implementations, such as any single implementation or any combination of implementations described below and/or in connection with one or more other processes described elsewhere herein.

In a first implementation, process 500 includes extracting task data from the client device, processing the task data to generate a set of work items, and identifying the one or more steps based on the set of work items.

In a second implementation, process 500 includes training a workflow generation model using the training data, and parsing the new task to identify the one or more steps includes parsing the new task using the trained workflow generation model.

In a third implementation, process 500 includes monitoring a data stream of workflow completion data regarding completion of a new workflow associated with the workflow recommendation, and updating the new workflow during completion of the new workflow based on monitoring the data stream.

In a fourth implementation, process 500 includes detecting an event associated with the new workflow, and updating the new workflow includes updating the new workflow based on detecting the event.

In a fifth implementation, process 500 includes receiving a change request associated with the new workflow, and updating the new workflow includes updating the new workflow based on the change request.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
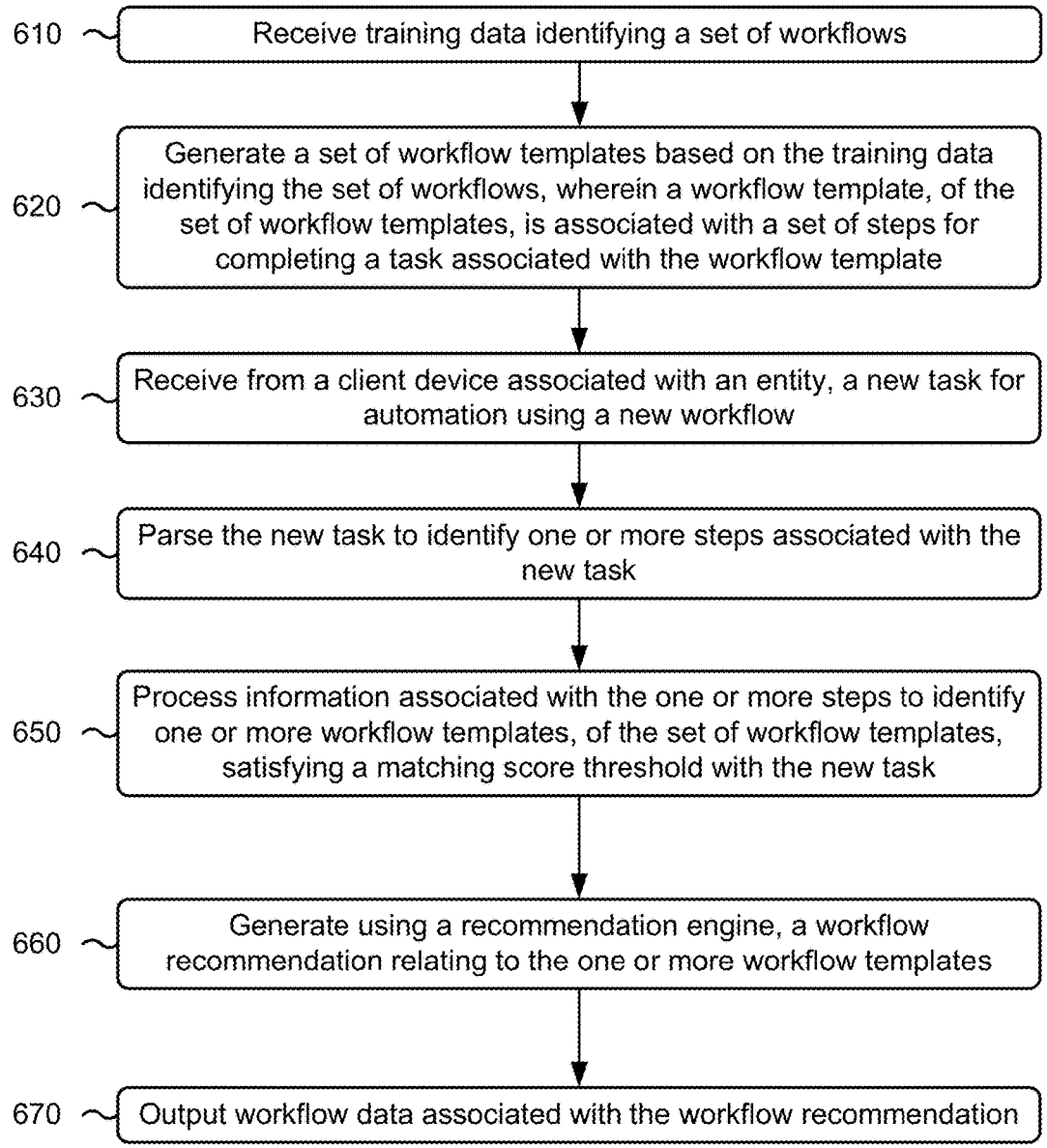

FIG. 6 is a flowchart of an example process 600 associated with automatic workflow generation and optimization. In some implementations, one or more process blocks of FIG. 6 are performed by a device (e.g., workflow management system 301). In some implementations, one or more process blocks of FIG. 6 are performed by another device or a group of devices separate from or including the device, such as a client device (e.g., client device 330) and/or a data source (e.g., data source 340). Additionally, or alternatively, one or more process blocks of FIG. 6 may be performed by one or more components of device 400, such as processor 420, memory 430, input component 440, output component 450, and/or communication component 460.

As shown in FIG. 6, process 600 may include receiving training data identifying a set of workflows (block 610). For example, the device may receive training data identifying a set of workflows, as described above.

As further shown in FIG. 6, process 600 may include generating a set of workflow templates based on the training data identifying the set of workflows, wherein a workflow template, of the set of workflow templates, is associated with a set of steps for completing a task associated with the workflow template (block 620). For example, the device may generate a set of workflow templates based on the training data identifying the set of workflows, wherein a workflow template, of the set of workflow templates, is associated with a set of steps for completing a task associated with the workflow template, as described above. In some implementations, a workflow template, of the set of workflow templates, is associated with a set of steps for completing a task associated with the workflow template.

As further shown in FIG. 6, process 600 may include receiving, from a client device associated with an entity, a new task for automation using a new workflow (block 630). For example, the device may receive, from a client device associated with an entity, a new task for automation using a new workflow, as described above.

As further shown in FIG. 6, process 600 may include parsing the new task to identify one or more steps associated with the new task (block 640). For example, the device may parse the new task to identify one or more steps associated with the new task, as described above.

As further shown in FIG. 6, process 600 may include processing information associated with the one or more steps to identify one or more workflow templates, of the set of workflow templates, satisfying a matching score threshold with the new task (block 650). For example, the device may process information associated with the one or more steps to identify one or more workflow templates, of the set of workflow templates, satisfying a matching score threshold with the new task, as described above.

As further shown in FIG. 6, process 600 may include generating, using a recommendation engine, a workflow recommendation relating to the one or more workflow templates (block 660). For example, the device may generate, using a recommendation engine, a workflow recommendation relating to the one or more workflow templates, as described above.

As further shown in FIG. 6, process 600 may include outputting workflow data associated with the workflow recommendation (block 670). For example, the device may outputting workflow data associated with the workflow recommendation, as described above.

Process 600 may include additional implementations, such as any single implementation or any combination of implementations described below and/or in connection with one or more other processes described elsewhere herein.

In a first implementation, process 600 includes receiving a negative response to the workflow recommendation, and feeding the negative response to the workflow into the recommendation engine to retrain the recommendation engine.

In a second implementation, process 600 includes generating a new workflow recommendation based on feeding the negative response to the workflow into the recommendation engine to retrain the recommendation engine, and outputting information identifying the new workflow recommendation.

In a third implementation, process 600 includes monitoring a data stream to generate a data set regarding completion of a workflow associated with the workflow recommendation, and feeding the data stream into the recommendation engine to retrain the recommendation engine.

In a fourth implementation, process 600 includes generating a new workflow recommendation based on feeding the data stream into the recommendation engine to retrain the recommendation engine, and outputting information identifying the new workflow recommendation.

In a fifth implementation, the data set regarding completion of the workflow includes at least one of a path traversed within the workflow, an amount of time spent on a process step of the workflow, an idle time during completion of the workflow, a completion of a process step of the workflow, or a failure of completion of a process step of the workflow.

In a sixth implementation, parsing the new task to identify the one or more steps includes parsing the new task using at least one of a regression random forest algorithm, a support vector regression algorithm, or a naïve Bayes classification algorithm.

In a seventh implementation, processing the information associated with the one or more steps to identify the one or more workflow templates includes processing the information associated with the one or more steps using at least one of a regression random forest algorithm or a support vector regression algorithm.

In an eighth implementation, process 600 includes optimizing a new workflow associated with the workflow recommendation using at least one of a K-means clustering algorithm, or a discriminant analysis algorithm.

In a ninth implementation, the workflow recommendation includes information identifying at least one of a step duration for a particular step in a new workflow, a process path for the new workflow, a quantity of times that the particular step is performed in the new workflow, a quantity of active users of the new workflow, the one or more templates associated with the new workflow, or an idle time associated with the new workflow.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
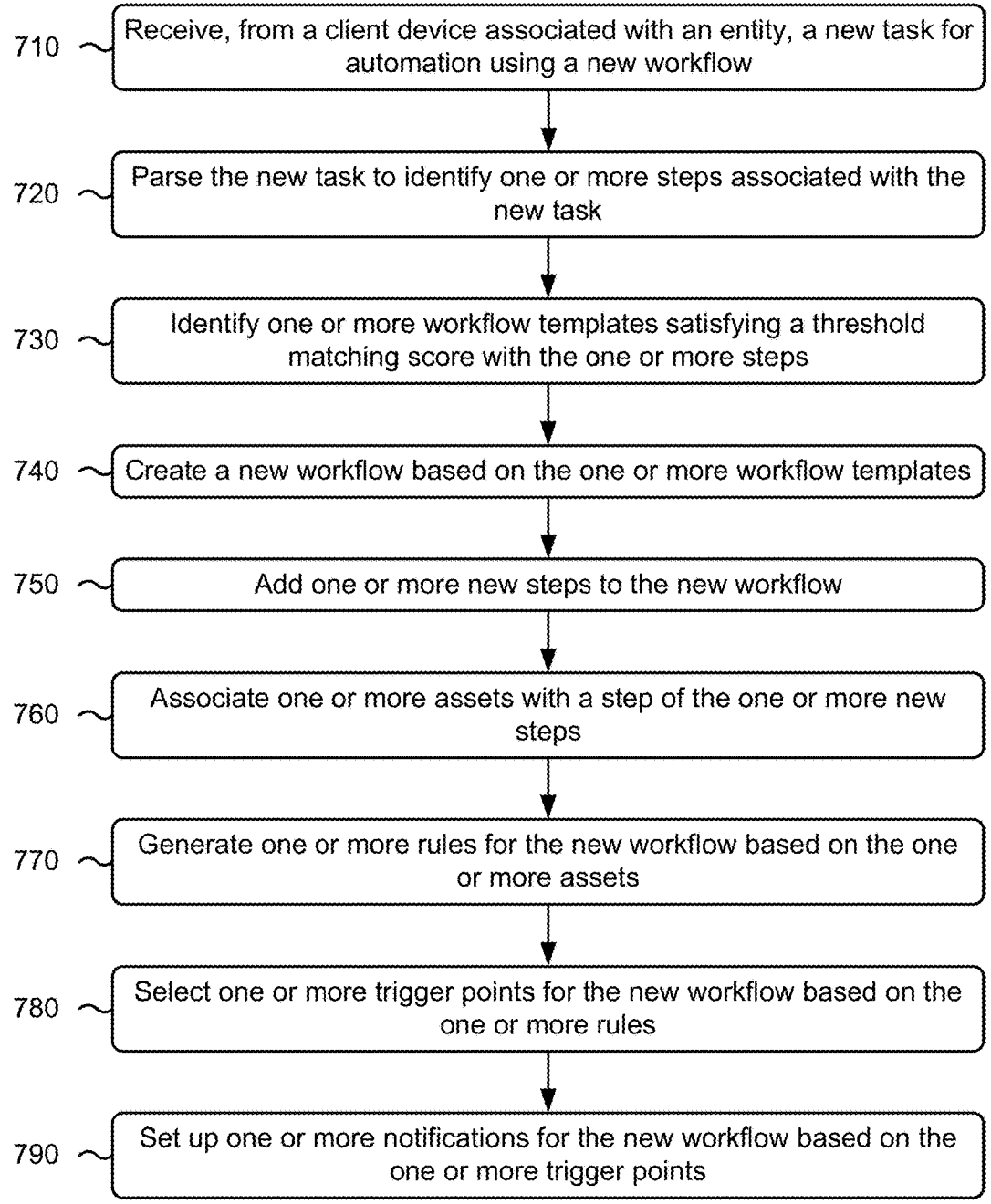

FIG. 7 is a flowchart of an example process 700 associated with automatic workflow generation and optimization. In some implementations, one or more process blocks of FIG. 7 are performed by a device (e.g., workflow management system 301). In some implementations, one or more process blocks of FIG. 7 are performed by another device or a group of devices separate from or including the device, such as a client device (e.g., client device 330) and/or a data source (e.g., data source 340). Additionally, or alternatively, one or more process blocks of FIG. 7 may be performed by one or more components of device 400, such as processor 420, memory 430, input component 440, output component 450, and/or communication component 460.

As shown in FIG. 7, process 700 may include receiving, from a client device associated with an entity, a new task for automation using a new workflow (block 710). For example, the device may receive, from a client device associated with an entity, a new task for automation using a new workflow, as described above.

As further shown in FIG. 7, process 700 may include parsing the new task to identify one or more steps associated with the new task (block 720). For example, the device may parse the new task to identify one or more steps associated with the new task, as described above.

As further shown in FIG. 7, process 700 may include identifying one or more workflow templates satisfying a threshold matching score with the one or more steps (block 730). For example, the device may identify one or more workflow templates satisfying a threshold matching score with the one or more steps, as described above.

As further shown in FIG. 7, process 700 may include creating a new workflow based on the one or more workflow templates (block 740). For example, the device may create a new workflow based on the one or more workflow templates, as described above.

As further shown in FIG. 7, process 700 may include adding one or more new steps to the new workflow (block 750). For example, the device may add one or more new steps to the new workflow, as described above.

As further shown in FIG. 7, process 700 may include associating one or more assets with a step of the one or more new steps (block 760). For example, the device may associate one or more assets with a step of the one or more new steps, as described above.

As further shown in FIG. 7, process 700 may include generating one or more rules for the new workflow based on the one or more assets (block 770). For example, the device may generate one or more rules for the new workflow based on the one or more assets, as described above.

As further shown in FIG. 7, process 700 may include selecting one or more trigger points for the new workflow based on the one or more rules (block 780). For example, the device may select one or more trigger points for the new workflow based on the one or more rules, as described above.

As further shown in FIG. 7, process 700 may include setting up one or more notifications for the new workflow based on the one or more trigger points (block 790). For example, the device may set up one or more notifications for the new workflow based on the one or more trigger points, as described above.

Process 700 may include additional implementations, such as any single implementation or any combination of implementations described below and/or in connection with one or more other processes described elsewhere herein.

In a first implementation, process 700 includes creating the new workflow based on processing data associated with the new task using a plurality of prediction models.

In a second implementation, the plurality of prediction models includes at least one of a template predictor, a workflow predictor, a step predictor, an asset predictor, a rule predictor, a trigger predictor, or a notification predictor.

In a third implementation, the plurality of prediction models includes a first model using a first type of algorithm and a second model using a second type of algorithm that is different from the first type of algorithm.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, communicatively coupled to the one or more memories, configured to:
receive training data identifying a set of workflows;
generate a set of workflow templates based on the training data identifying the set of workflows,
wherein a workflow template, of the set of workflow templates, is associated with a set of steps for completing a task associated with the workflow template;
receive, from a client device associated with an entity, a new task for automation using a new workflow;
parse the new task to identify one or more steps associated with the new task;
process information associated with the one or more steps to identify one or more workflow templates, of the set of workflow templates, satisfying a matching score threshold with the new task;
generate a workflow recommendation relating to the one or more workflow templates; and
output workflow data associated with the workflow recommendation.

2. The device of claim 1, wherein the one or more processors, to parse the new task to identify the one or more steps, are configured to:
extract task data from the client device;
process the task data to generate a set of work items; and
identify the one or more steps based on the set of work items.

3. The device of claim 1, wherein the one or more processors are further configured to:
train a workflow generation model using the training data; and
wherein the one or more processors, to parse the new task to identify the one or more steps, are configured to:
parse the new task using the trained workflow generation model.

4. The device of claim 1, wherein the one or more processors are further configured to:
monitor a data stream of workflow completion data regarding completion of a new workflow associated with the workflow recommendation; and update the new workflow during completion of the new workflow based on monitoring the data stream.

5. The device of claim 4, wherein the one or more processors are further configured to:
detect an event associated with the new workflow; and
wherein the one or more processors, to update the new workflow, are configured to:
update the new workflow based on detecting the event.

6. The device of claim 4, wherein the one or more processors are further configured to:
receive a change request associated with the new workflow; and
wherein the one or more processors, to update the new workflow, are configured to:
update the new workflow based on the change request.

7. A method, comprising:
receiving, by a device, training data identifying a set of workflows;
generating, by the device, a set of workflow templates based on the training data identifying the set of workflows,
wherein a workflow template, of the set of workflow templates, is associated with a set of steps for completing a task associated with the workflow template;
receiving, by the device and from a client device associated with an entity, a new task for automation using a new workflow;
parsing, by the device, the new task to identify one or more steps associated with the new task;
processing, by the device, information associated with the one or more steps to identify one or more workflow templates, of the set of workflow templates, satisfying a matching score threshold with the new task;
generating, by the device and using a recommendation engine, a workflow recommendation relating to the one or more workflow templates; and
outputting, by the device, workflow data associated with the workflow recommendation.

8. The method of claim 7, further comprising:
receiving a negative response to the workflow recommendation; and
feeding the negative response to the workflow into the recommendation engine to retrain the recommendation engine.

9. The method of claim 8, further comprising:
generating a new workflow recommendation based on feeding the negative response to the workflow into the recommendation engine to retrain the recommendation engine; and
outputting information identifying the new workflow recommendation.

10. The method of claim 7, further comprising:
monitoring a data stream to generate a data set regarding completion of a workflow associated with the workflow recommendation; and
feeding the data stream into the recommendation engine to retrain the recommendation engine.

11. The method of claim 10, further comprising:
generating a new workflow recommendation based on feeding the data stream into the recommendation engine to retrain the recommendation engine; and
outputting information identifying the new workflow recommendation.

12. The method of claim 10, wherein the data set regarding completion of the workflow includes at least one of:
a path traversed within the workflow,
an amount of time spent on a process step of the workflow,
an idle time during completion of the workflow,
a completion of a process step of the workflow, or
a failure of completion of a process step of the workflow.

13. The method of claim 7, wherein parsing the new task to identify the one or more steps comprises:
parsing the new task using at least one of:
a regression random forest algorithm,
a support vector regression algorithm, or
a naive Bayes classification algorithm.

14. The method of claim 7, wherein processing the information associated with the one or more steps to identify the one or more workflow templates comprises:
processing the information associated with the one or more steps using at least one of:
a regression random forest algorithm or
a support vector regression algorithm.

15. The method of claim 7, further comprising:
optimizing a new workflow associated with the workflow recommendation using at least one of:
a K-means clustering algorithm, or
a discriminant analysis algorithm.

16. The method of claim 7, wherein the workflow recommendation includes information identifying at least one of:
a step duration for a particular step in a new workflow,
a process path for the new workflow,
a quantity of times that the particular step is performed in the new workflow,
a quantity of active users of the new workflow,
the one or more templates associated with the new workflow, or
an idle time associated with the new workflow.

17. A non-transitory computer-readable medium storing a set of instructions, the set of instructions comprising:
one or more instructions that, when executed by one or more processors of a device, cause the device to:
receive, from a client device associated with an entity, a new task for automation using a new workflow;
parse the new task to identify one or more steps associated with the new task;
identify one or more workflow templates satisfying a threshold matching score with the one or more steps;
create a new workflow based on the one or more workflow templates;
add one or more new steps to the new workflow;
associate one or more assets with a step of the one or more new steps;
generate one or more rules for the new workflow based on the one or more assets;
select one or more trigger points for the new workflow based on the one or more rules; and
set up one or more notifications for the new workflow based on the one or more trigger points.

18. The non-transitory computer-readable medium of claim 17, wherein the one or more instructions, that cause the device to creating the new workflow, cause the device to:
create the new workflow based on processing data associated with the new task using a plurality of prediction models.

19. The non-transitory computer-readable medium of claim 18, wherein the plurality of prediction models includes at least one of:
a template predictor,
a workflow predictor,
a step predictor,
an asset predictor,
a rule predictor, a trigger predictor, or
a notification predictor.

20. The non-transitory computer-readable medium of claim 18, wherein the plurality of prediction models includes a first model using a first type of algorithm and a second model using a second type of algorithm that is different from the first type of algorithm.

\* \* \* \* \*